United States Patent [19]
Gollomp

[11] 3,812,334
[45] May 21, 1974

[54] HIGH SPEED MEASUREMENT SYSTEM

[75] Inventor: Bernard P. Gollomp, Far Rockaway, N.Y.

[73] Assignee: The Bendix Corporation, Teterboro, N.J.

[22] Filed: June 8, 1972

[21] Appl. No.: 260,922

[52] U.S. Cl............. 235/151, 235/150.5, 235/151.3
[51] Int. Cl. .............................................. G06j 1/00
[58] Field of Search............. 235/151, 150.5, 151.3; 340/347 AD; 324/99 D

[56] References Cited
UNITED STATES PATENTS

| | | | |
|---|---|---|---|
| 3,653,037 | 3/1972 | Utley............................ | 340/347 AD |
| 3,656,116 | 4/1972 | Jansen, Jr. ................. | 340/347 AD X |
| 3,493,731 | 2/1970 | Lemonde .................. | 340/347 AD X |
| 3,260,998 | 7/1966 | Fluegel ........................... | 235/151 X |
| 3,419,853 | 12/1968 | Silverman ..................... | 235/150.5 X |
| 3,517,169 | 6/1970 | Malavard et al................. | 235/150.5 |

*Primary Examiner*—Joseph F. Ruggiero
*Attorney, Agent, or Firm*—Anthony F. Cuoco; S. H. Hartz

[57] ABSTRACT

A digital multimeter and associated circuitry provides a high speed conversion, at precise increments, of analog input signals to a digital format while measuring and analyzing the input signals. Means are provided for correlating low speed measurements having relatively high resolution with high speed measurements having relatively low resolution.

5 Claims, 1 Drawing Figure

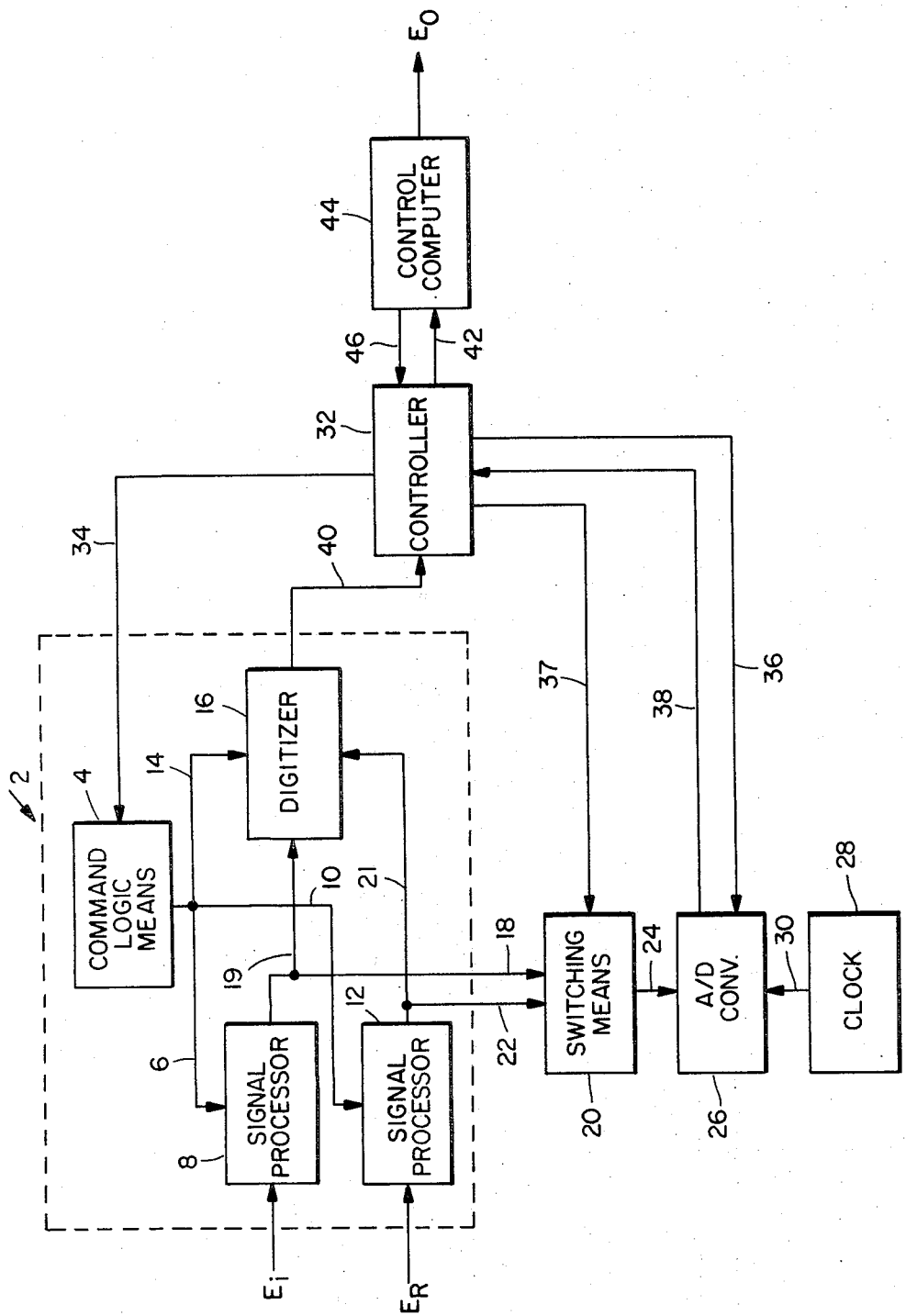

3,812,334

HIGH SPEED MEASUREMENT SYSTEM

BACKGROUND OF THE INVENTION

1. Field of the Invention

This invention relates generally to high speed means for converting analog input signals to a digital format and particularly to means of the type described for measuring and analyzing the input signals and for correlating low speed, relatively high resolution measurements with high speed, relatively low resolution measurements.

2. Description of the Prior Art

There is a need in computer systems for equipment which achieves high speed conversion of analog input signals to digital output signals. Equipment of this nature, in order to have maximum utility, must satisfy several requirements. First, it is important that commercially available equipment such as digital voltmeters or digital multimeters be utilized. Second, existing programmable and automatic input signal ranging capabilities must be used so that the converter is required to operate over only one range. Third, the input signals must be measured and analyzed. The analysis may include determination of signal amplitude for single or multiple points of inflection (maximum or minimum); determination of the time at which such points of inflection occur with respect to initiation of the measurements or some other independent event; determination of the time between points of inflection; determination of the absolute value of a percentage of the maximum or minimum; determination of the time between a percentage of a maximum value and either: the maximum value, another maximum value, the minimum value or some other percentage of the maximum or minimum values; determination of the absolute signal value at a specific time; and determination of the rate of signal change with respect to specific time intervals or between a percentage of maximum or minimum signal values.

Finally, there must be a correlation between low speed relatively high resolution measurements and high speed relatively low resolution measurements. Redundancy must be avoided and the equipment must have high speed, relatively high resolution capabilities. Prior to the present invention there has not been a system which satisfies these requirements.

SUMMARY OF THE INVENTION

This invention contemplates a system including a controller which enables a control computer to range a digital multimeter for selection of an input signal measurement mode, i.e. voltage, resistance, voltage ratio etc. The measured signal is buffered and routed through switching means to a high speed analog to digital converter whereupon a clock initiates a conversion cycle. When the analog to digital conversion is completed the digital data is transferred through the controller to the control computer and stored thereby. Since the conversion is clock controlled, the data is stored in the computer in time ordered sequence and therefore can be analyzed by the computer.

One object of this invention is to provide high speed measurement of analog input signals.

Another object of this invention is to convert the analog input signals to a digital format at precise increments.

Another object of this invention is to utilize input signal ranging capabilities so that the analog to digital conversion is requied to operate over one range.

Another object of this invention is to correlate high speed relatively low resolution measurements with low speed relatively high resolution measurements.

Another object of this invention is to analyze the measured signals.

Another object of this invention is to avoid redundant signal processing equipment and to provide in a single system high speed, high resolution capabilities.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawing is for illustration purposes only and is not to be construed as defining the limits of the invention.

DESCRIPTION OF THE DRAWINGS

The single FIGURE in the drawing is a block diagram of a high speed measurement system according to the invention.

DESCRIPTION OF THE INVENTION

A digital multimeter 2 includes command logic means 4 connected through an output conductor 6 to a signal processor 8. Command logic means 4 is connected through another output conductor 10 to a redundant signal processor 12 and through an output conductor 14 to a digitizer 16. An analog input signal $E_i$ is applied to signal processor 8 and an analog reference input signal $E_R$ is applied to signal processor 12.

Digital multimeter 2 is a commercially available device well known in the art and may be of the digital voltmeter type such as manufactured by Lear Siegler, Inc. Cimron Division and described in their Instruction Manual for Model 4651–1321 Digital Volt-Ratiometer. The aforenoted instruction manual was published and made available to the public prior to the filing date of this application.

Signal processor 8 is connected through an output conductor 18 to a switching means 20 and to digitizer 16 through an output conductor 19. Signal processor 12 is connected through an output conductor 22 to switching means 20 and to digitizer 16 through an output conductor 21. Switching means 20 is connected through an output conductor 24 to a high speed analog to digital converter 26. A clock 28 is connected through an output conductor 30 to analog to digital converter 26.

A controller 32 is connected through an output conductor 34 to command logic means 4, through an output conductor 36 to analog to digital converter 26 and through an output conductor 37 to switching means 20. Analog to digital converter 26 is connected through an output conductor 38 to controller 32. Digitizer 16 in digital multimeter 2 is connected through output conductor 40 to controller 32. Controller 32 may be of the type manufactured by the Navigation & Control Division of The Bendix Corporation as Device Controller 14 (DVM) and described in the Navigation & Control Division Logic Diagram 1950410, dated Feb. 2, 1970.

Controller 32 is connected through an output conductor 42 to a control computer 44. Control computer 44 is connected through an output conductor 46 to controller 32. Control computer 44 provides an output signal $E_0$. Control computer 44 may be of the type manufactured by the Navigation & Control Division of The Bendix Corporation as the BDX-6200 Computer as described in the Navigation & Control Division Publication No. 703-24, dated Mar. 24, 1970.

OPERATION

Control computer 44 enables digital multimeter 2 through controller 32 to select an appropriate measurement mode i.e. measurement of a.c. voltage, resistance, d.c. voltage or voltage ratio ($E_i/E_R$); to route buffered input signals from signal processors 8 and 12 through switching means 20 to analog to digital converter 26; and to provide resetting features for the system.

Signal processors 8 and 12 include buffering amplifiers, attenuators for signal ranging and signal conversion circuitry responsive to analog input signals $E_i$ and $E_R$ for providing a d.c. signal for any one voltage range. The d.c. signal may be an attenuated or amplified and buffered d.c. signal representing an input d.c. voltage, an attenuated or amplified demodulated and buffered d.c. signal representing an a.c. input voltage or a buffered d.c. signal representing a resistance value and provided by a constant current applied to the resistance to be measured. For ratio measurements, redundant signal processor 12 processes signal $E_R$.

The d.c. signal so provided is routed through switching means 20, controlled by computer 44 through controller 32, to analog to digital converter 26. Clock 28 initiates a conversion cycle and when the conversion cycle has been concluded the digital data is transferred from converter 26 to control computer 44 through controller 32 and stored in the computer which may include a core memory device for this purpose. Since clock 28 initiates all conversion cycles the data is stored in the computer core memory in time ordered sequence in either ascending or descending order. Thus, the time ordered sequence of conversion is preserved and each measured value of a particular signal is held in the computer memory for a particular interval.

Since the measured data is stored in the computer core memory in time ordered sequence the data may be evaluated or analyzed by the computer. For example, a maximum value is determined by subtracting, in succession, a preceeding value from a successive value until the difference is first zero and then negative. The position of the maximum value determines its time occurrence, i.e. "position number" times "time increment." This means that the time between "X" percent of maximum and maximum is determined by multiplying maximum by "X" percent, which matches the resulting product, whereupon subtraction determines the time difference between "X" percent of maximum to maximum.

For signal ratio measurements, the processed reference signal ($E_R$) from digital signal processor 12 of digital multimeter 2 is used as the reference for the high speed analog to digital conversion. When a programmed input routine is used, a programmed number of conversions may be skipped. This may also be accomplished with a hardware counter. The rationale for doing this is to avoid storing extra data and for keeping the computer memory small.

It will now be seen that the aforenoted objects of the invention have been achieved. A high speed signal measuring system is provided. The system converts analog input signals at precise increments to a digital format, measures the signals and analyzes signal characteristics. Redundant equipment is avoided for signal processing and a single system provides the features of high speed, high resolution measurement capability. Low speed, high resolution, high speed low resolution correlation is achieved because of the common use of signal processors 6, 12 i.e. in digital multimeter 2 and the analog to digital conversion channel.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A high speed signal measuring and analysis system in association with a digital computer, comprising:
    signal measuring means including command logic means and signal processing means connected to the command logic means and controlled thereby so as to be responsive to input signals for providing a signal corresponding to a predetermined range of the input signals;
    a controller connecting the computer and the command logic means and enabling the computer to control the signal measuring means to measure analog input signals;
    an analog to digital converter;
    switching means connecting the signal processing means to the converter;
    the controller connecting the computer to the switching means and enabling the computer to control said means to pass the measured signals to the converter; and
    the controller connecting the converter to the computer for transferring the converted signals to the computer for analysis thereby.

2. A system as described by claim 1, including:
    a clock connected to the converter for initiating conversion cycles in time ordered sequence; and
    the controller connecting the computer to the converter and enabling the computer to control the switching means to transfer the time ordered converted signals to the computer for analysis thereby.

3. A system as described by claim 1, wherein the signal measuring means includes:
    a digitizer connected to the signal processing means for digitizing the signals therefrom; and
    the controller connecting the digitizer to the computer for controlling the digitizer to transfer the digitized signals to said computer.

4. A system as described by claim 3, wherein:
    the command logic means is connected to the digitizer for controlling said digitizer to digitize the processed signals.

5. A system as described by claim 1, wherein the signal processing means includes:
    a first signal processor responsive to input signals; and
    a second signal processor responsive to reference input signals.

* * * * *